No. 741,256.

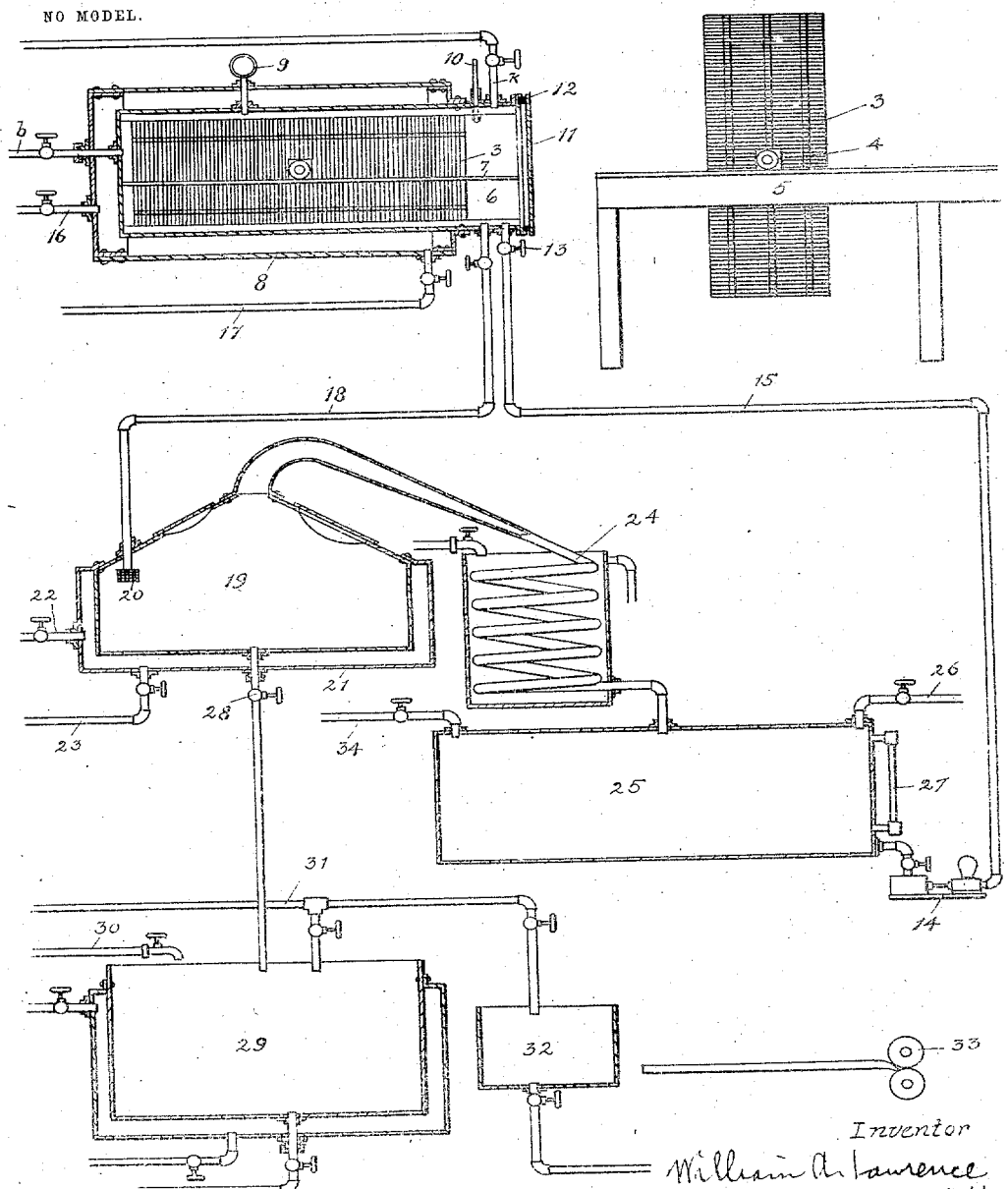

Patented October 13, 1903.

UNITED STATES PATENT OFFICE.

WILLIAM A. LAWRENCE, OF NEW YORK, N. Y., ASSIGNOR TO CONTINENTAL RUBBER COMPANY, OF JERSEY CITY, NEW JERSEY, A CORPORATION OF NEW JERSEY.

ART OF EXTRACTING GUM.

SPECIFICATION forming part of Letters Patent No. 741,256, dated October 13, 1903.

Application filed July 2, 1902. Serial No. 114,082. (No specimens.)

*To all whom it may concern:*

Be it known that I, WILLIAM A. LAWRENCE, a citizen of the United States, residing in the borough of Queens, city and State of New York, have invented certain new and useful Improvements in the Art of Extracting Gum, of which the following is a specification.

My invention has for its object the extraction of rubber or rubber-like gums from plants by a continuous process. This process I will proceed to describe in detail, reference being made to the accompanying drawing as showing one form of apparatus which may be used to carry out my invention.

The scope of the invention will be defined in the appended claims.

It is well known that a certain plant or shrub which is known to botanists as *Parthenium argentatum* contains a considerable quantity of rubber or rubber-like gum, which may be extracted therefrom and which possesses many or all of the valuable properties of india-rubber and is very similar thereto in its physical and chemical characteristics. This plant or shrub grows in large quantities in Mexico, where it is commonly known by the names of "Guayule," "Hule," "Yule," "Copalin," "Jiguhite," and "Yerba del Negro."

While my invention is particularly adapted to the extraction of gum from the plant above mentioned, I do not desire to limit myself to the use of this plant, but to use any and all plants from which a rubber or rubber-like gum or gutta-percha may be extracted by the process or processes claimed.

The first step in my continuous process is the treatment of the plant with a solvent for the rubber or rubber-like gum contained therein. Before doing this, however, I prefer to macerate the plant in some manner in order that the solvent may extract the gum therefrom in the most thorough manner and in the least possible time. This may be accomplished in several ways—as, for example, by running the plants between corrugated or roughened rollers, and thereby crushing the stalks, branches, and twigs, or by chopping the plants into small pieces. The macerated plants are then treated with a solvent, as above mentioned. The solvent which I prefer to use on account of its cheapness and the effectiveness with which it penetrates the bark and wood and dissolves the gums therein is naphtha. Other volatile solvents may, however, be used, such as other hydrocarbon solvents of rubber, (gasolene, benzin, benzole, toluene, &c.,) ether, chloroform, carbon bisulfid, and carbon tetrachlorid. Any one of these solvents may be used and is covered by the term "suitable solvent" in the claims. It has heretofore been proposed to treat rubber-bearing plants in this manner and then obtain a rubber-like product by evaporating from the solution all or nearly all of the naphtha. This process has two serious disadvantages, however.

In the first place I have found that when one attempts to drive off the naphtha by heat, while the greater portion evaporates very readily a point is soon reached, especially where the lower or heavier grades of naphtha are used, when evaporation takes place very slowly. It is very desirable to use as low a grade of naphtha as possible on account of the cheapness of the low grades, and in practice I have found that the use in my process of naphtha of about 74° Baumé gives very good results. Such naphtha as this, however, contains some oil which is above 74° and is more easily evaporated than the bulk of the oil, and also much oil which is below 74° and very much less rapidly evaporated. In fact, I have found that the last or residual portion of the naphtha, being held by the heavy mass of rubber, requires for its evaporation a very long application of heat. For example, I have subjected a solution of the kind described to a continuous temperature of 270° Fahrenheit, (which is held to be the maximum that can be used without danger of injuring the rubber,) with the result that seventy-five per cent. of the naphtha was evaporated in sixty-one minutes, while further treatment of the residue for seven hours resulted in a product still containing about thirteen per cent. of its weight of naphtha. Such a process as this, therefore, results either in an inferior product containing naphtha or else requires the expenditure of a great amount of heat and labor to entirely eradicate the naphtha.

The second disadvantage of the naphtha process heretofore used is that the product obtained is not a pure rubber, but contains a large percentage of resin, inasmuch as the naphtha dissolves both the rubber and the resin contained in the plants. The product is therefore greatly inferior to that obtained by my method.

In the process invented by me I proceed with the evaporation of the naphtha until I reach a point where further evaporation becomes somewhat difficult, although there is still a considerable percentage of naphtha or other solvent remaining. At this point I introduce into the rubber solution a hot alkaline solution, as a solution of sodium hydrate or caustic soda, or, preferably, the rubber solution is introduced into the alkaline solution, the temperature of which may be near its boiling-point. The alkali is a very good solvent for the resins and rapidly dissolves them. The effect of this is to separate the gum from the residue of the naphtha or other solvent. This separation is due to the fact that the said solvent is volatile and is for the most part evaporated by the hot alkaline solution. The dissolving by the alkali of the resins breaks up the gummy mass and permits the volatilization of the naphtha or other solvent. Furthermore, the alkaline solution to some extent dissolves the solvent. The result is that the gum rises to the surface in a mass of about the consistency of cream. By treating this rubber product with cold water all of the alkali is washed out and the gum hardens into a doughy mass and may then be rolled into sheets. The product obtained in this manner is remarkably free from impurities, is highly elastic, and possesses many or all of the valuable properties of the high grades of ordinary india-rubber.

It has also been proposed to obtain rubber or rubber-like gums from plants by treating the plants directly with an alkaline solution. In this process the woody fibers and bark are attacked by the alkali, and the rubber being thereby liberated rises to the top and may be skimmed off. This method is greatly inferior to mine, however, in that small pieces of twigs, wood, woody fiber, &c., are unavoidably mixed with the rubber and cannot readily be eradicated. In my method the gums are first dissolved, and it is evident that the solution may be strained, so as to contain no foreign particles whatever. Furthermore, enough alkali in the old process must be used to completely disintegrate the plants; otherwise much of the gum will be retained in the plant. This requires several times as much alkali as is needed in my process, where the alkali performs an entirely different function, being used merely to dissolve the resins from the residuum remaining after evaporation, thereby breaking up the gummy mass and evaporating and dissolving the residue of the extracting solvent.

My process is a very economical one, in that the greater part of the naphtha used may be recovered for further use and only a small quantity of alkali is necessary.

A new and useful composition of matter is formed as a by-product in the carrying out of my process and forms the subject-matter of a divisional application, filed October 6, 1902, Serial No. 126,087.

I will now describe one form of apparatus which may be used in carrying out my invention.

The drawing shows the apparatus in vertical section, the same being arranged in such a manner that gravity aids largely in handling the materials and solutions.

The rubber-bearing plants are first macerated or crushed in any suitable manner, preferably on a floor above the parts shown. They are then dropped through an opening in the floor into the cage or basket 3. This cage is constructed with steel ribs and is lined with wire-cloth having a fine mesh. The cage rests upon trunnions 4, which are supported by the track 5. The cage having been filled with the plants is now pushed forward and tilted, so as to enter the extracting-drum 6. This drum is provided with two tracks 7, as shown, upon which the trunnions 4 of the cage rest. The drum 6 is surrounded by a steam-jacket 8, which is supplied from the steam-pipe 16, the drip being carried off by the pipe 17.

9 is a pressure-gage, and 10 is a thermometer extending into the interior of the drum 6. After the cage has been run into the drum the same is tightly closed by the door 11, which bears against a gasket 12 and is bolted in position. The valve 13 is now opened and naphtha is pumped into the tank by the depressed pump 14 through the pipe 15. I have obtained good results by the use of naphtha of from 62° to 80° Baumé in the proportion of about twenty parts by weight to one part of the macerated plant. By "naphtha" I mean the product ordinarily derived from petroleum and allied to gasolene and benzin, which are equivalent thereto. The valve 13 having then been closed, steam is admitted to the steam-jacket until the pressure-gage of the drum 6 registers sixty pounds, the thermometer indicating at the same time from 110° to 114° Fahrenheit. The extractor is kept at this pressure for four hours, which appears to be a sufficient treatment to thoroughly dissolve the gums and resins contained in the plants, though this may vary with different kinds of plants treated and the extent to which they have been macerated. At this point I draw off the solution through the pipe 18, which empties into the evaporator 19 through the strainer 20. Any suitable form of evaporator may be used, the one shown being a still surrounded by a steam-jacket 21, having inlet and outlet pipes 22 and 23. The evaporated solvent is condensed in the worm 24 and flows into the supply-tank 25, to be used again as needed. The supply-tank has a supply-pipe 26 and a gage-glass 27.

I find in practice that the great bulk of the naphtha may be readily driven off by the application of heat, and no difficulty is encountered until the thickening of the solution begins to render evaporation more difficult. When such a point as this is reached and the solution in the evaporator contains, say, thirty per cent. of naphtha to seventy per cent. of other matter, I open the discharge-valve 28, and the hot solution passes into the tank 29, containing a hot alkaline solution. This may be an open steam-jacketed tank, as shown, in order to keep the alkaline solution hot and to permit the gum to be readily removed therefrom, or the tank 29 may be a closed tank in order that that portion of the residue of the solvent used in extracting the gum and resins which are evaporated by the hot alkaline solution may be recovered. In this case the part of the tank 29 above the alkaline solution should be provided with a pipe leading to a suitable refrigerator. The alkaline solution is admitted through the pipe 30. I have secured desirable results by the use of a twelve-per-cent. solution of sodium hydrate, (although a weaker solution may be used,) introducing therein one-fourth its volume of the naphtha, gum, and resin solution. The liquid in the tank is then kept at boiling-point with occasional stirring for about two hours. At the end of this time the alkali and heat have entirely separated the resin and naphtha from the rubber-like gum, and as the solution cools or is cooled the latter floats in a mass of about the consistency of cream. Cooling may be hastened by the introduction of cold water from the pipe 31. The gum is now drawn or skimmed off and subjected to repeated washings of first hot and then cold water in the tank 32. Under this treatment the gum assumes greater consistency, similar to that of dough. It may then be readily handled and run through rolls 33 into sheets. The rubber thus obtained is of remarkable purity and of excellent quality for use in manufacture.

I have also discovered that hot alcohol may be used as a substitute for or equivalent of the alkaline solution in the process just described. This process is exactly similar to that described, the only difference being that the gum as it separates, being heavier than alcohol, settles at the bottom of the tank and may be removed after the liquids have been drawn off, whereas the solution of sodium hydrate previously described is a feeble solvent of naphtha and the bulk of the residual naphtha is gotten rid of by evaporation. Alcohol is a very good solvent of naphtha, and while a portion of the residual naphtha is evaporated by the heated alcohol the bulk of it is dissolved by the alcohol.

I have shown and described an apparatus suitable for carrying out my process by the use of alcohol in an application, Serial No. 98,899, filed March 19, 1902, which application, however, does not include the subject-matter of the present application, but relates entirely to the recovery and separation of the alcohol and naphtha when both are used in the process herein claimed.

After the naphtha-rubber solution has been drawn off from the tank 6 it is found that a considerable amount of naphtha remains entangled by the macerated plants and also in the form of vapor. This naphtha may be recovered by the use of an apparatus disclosed in United States Letters Patent No. 450,501, according to the method therein set forth. I have not shown such apparatus in this application in order to avoid confusion, but have shown the steam-pipe $b$ communicating with the interior of the drum 6 for admitting the steam, the exit-pipe $k$, and the pipe 34 for introducing the naphtha recovered by the apparatus into the supply-tank 25.

It is not at all necessary that the apparatus just referred to should be used in the present art of extracting gum, though obviously it is more economical to do so.

In this description for the sake of brevity I have used prominently the term "naphtha" as a solvent of rubber, but I do not confine myself to that solvent, but include also any of the hydrocarbon solvents of rubber and such well-known solvents as ether, chloroform, carbon bisulfid, carbon tetrachlorid, or any mixtures of these solvents, and though I may have used only the term "rubber" I include also gutta-percha in my application as subject to the same process, with only such variations as will be readily manifest to any one versed in the arts.

I am aware that it has been proposed to treat plants containing milky juice, such as caoutchouc, with a solvent, and then to remove all or practically all of the solvent by distillation and to then treat the residue of caoutchouc, &c., with an alkaline solution, as set forth in the British Patent No. 11,561 of 1885. I consider my invention to be radically different from this process, however, as by my invention only a portion of the solvent is removed by distillation and a considerable percentage of the same is left in the residue. This remaining solvent is removed by means of the alkaline or alcoholic solution. I thereby avoid carrying on the distillation after it becomes difficult and avoid all danger of injuring the gum.

Having now fully disclosed my invention, what I claim, and desire to secure by Letters Patent, is—

1. The art of extracting rubber or rubber-like gum from plants, which consists in treating the plants with a suitable solvent for the gum, and then treating the solution, while it contains a considerable percentage of solvent, with an alkaline solution, whereby the gum is separated, substantially as described.

2. The art of extracting rubber or rubber-like gums from plants, which consists in treating the plants with a hydrocarbon solvent for gum, and then treating the solution, while it contains a considerable percentage of solvent, with an alkaline solution, whereby the gum is separated, substantially as described.

3. The art of extracting rubber or rubber-like gums from plants, which consists in treating the plants with a suitable solvent for the gum, and then treating the solution, while it contains a considerable percentage of solvent, with a solution of sodium hydrate, whereby the gum is separated, substantially as described.

4. The art of extracting rubber or rubber-like gums from plants, which consists in treating the plants with a hydrocarbon solvent for the gum, and then treating the solution, while it contains a considerable percentage of solvent, with a solution of sodium hydrate, whereby the gum is separated, substantially as described.

5. The art of extracting rubber or rubber-like gum from plants, which consists in treating the plants with a suitable solvent for the gums and resins of the plants, evaporating a portion of the solvent, and treating the residue while it contains a considerable percentage of the solvent, with a heated reagent which is a solvent of the resins of the plants and is a non-solvent of the gum, substantially as described.

6. The art of extracting rubber or rubber-like gum from plants, which consists in treating the plants with a hydrocarbon solvent for the gums and resins of the plants, evaporating a portion of the solvent, and treating the residue while it contains a considerable percentage of the solvent, with a heated reagent which is a solvent of the resins of the plants and is a non-solvent of the gum, substantially as described.

7. The art of extracting rubber or rubber-like gum from plants, which consists in treating the plants with a suitable solvent for the gum, evaporating a portion of the solvent until a residue remains which still contains a considerable percentage of the solvent, and then dissolving out the remainder of the solvent from the said residue, by means of a heated reagent which is a non-solvent of the gum, substantially as described.

8. The art of extracting rubber or rubber-like gum from plants, which consists in treating the plants with a hydrocarbon solvent for the gum, evaporating a portion of the solvent until a residue remains which still contains a considerable percentage of the solvent, and then dissolving out the remainder of the solvent from the said residue by means of a heated reagent which is a non-solvent of the gum, substantially as described.

WILLIAM A. LAWRENCE.

Witnesses:
JAMES J. COSGROVE,
DELOS HOLDEN

---

It is hereby certified that in Letters Patent No. 741,256, granted October 13, 1903, upon the application of William A. Lawrence, of New York, N. Y., for an improvement in the "Art of Extracting Gum," errors appear in the printed specification requiring correction, as follows: On page 3, line 58, a period should be substituted for the comma after the word "off," and the following word "whereas" should commence with a capital $W$; in line 61, same page, a comma should be substituted for the period after the word "evaporation," and the following word "Alcohol" should commence with a small $a$ instead of a capital; and that the said Letters Patent should be read with these corrections therein that the same may conform to the record of the case in the Patent Office.

Signed and sealed this 27th day of October, A. D., 1903.

[SEAL.]

F. I. ALLEN,
*Commissioner of Patents.* like gums from plants, which consists in treating the plants with a hydrocarbon solvent for gum, and then treating the solution, while it contains a considerable percentage of solvent, with an alkaline solution, whereby the gum is separated, substantially as described.

3. The art of extracting rubber or rubber-like gums from plants, which consists in treating the plants with a suitable solvent for the gum, and then treating the solution, while it contains a considerable percentage of solvent, with a solution of sodium hydrate, whereby the gum is separated, substantially as described.

4. The art of extracting rubber or rubber-like gums from plants, which consists in treating the plants with a hydrocarbon solvent for the gum, and then treating the solution, while it contains a considerable percentage of solvent, with a solution of sodium hydrate, whereby the gum is separated, substantially as described.

5. The art of extracting rubber or rubber-like gum from plants, which consists in treating the plants with a suitable solvent for the gums and resins of the plants, evaporating a portion of the solvent, and treating the residue while it contains a considerable percentage of the solvent, with a heated reagent which is a solvent of the resins of the plants and is a non-solvent of the gum, substantially as described.

6. The art of extracting rubber or rubber-like gum from plants, which consists in treating the plants with a hydrocarbon solvent for the gums and resins of the plants, evaporating a portion of the solvent, and treating the residue while it contains a considerable percentage of the solvent, with a heated reagent which is a solvent of the resins of the plants and is a non-solvent of the gum, substantially as described.

7. The art of extracting rubber or rubber-like gum from plants, which consists in treating the plants with a suitable solvent for the gum, evaporating a portion of the solvent until a residue remains which still contains a considerable percentage of the solvent, and then dissolving out the remainder of the solvent from the said residue, by means of a heated reagent which is a non-solvent of the gum, substantially as described.

8. The art of extracting rubber or rubber-like gum from plants, which consists in treating the plants with a hydrocarbon solvent for the gum, evaporating a portion of the solvent until a residue remains which still contains a considerable percentage of the solvent, and then dissolving out the remainder of the solvent from the said residue by means of a heated reagent which is a non-solvent of the gum, substantially as described.

WILLIAM A. LAWRENCE.

Witnesses:
JAMES J. COSGROVE,
DELOS HOLDEN

---

It is hereby certified that in Letters Patent No. 741,256, granted October 13, 1903, upon the application of William A. Lawrence, of New York, N. Y., for an improvement in the "Art of Extracting Gum," errors appear in the printed specification requiring correction, as follows: On page 3, line 58, a period should be substituted for the comma after the word "off," and the following word "whereas" should commence with a capital $W$; in line 61, same page, a comma should be substituted for the period after the word "evaporation," and the following word "Alcohol" should commence with a small $a$ instead of a capital; and that the said Letters Patent should be read with these corrections therein that the same may conform to the record of the case in the Patent Office.

Signed and sealed this 27th day of October, A. D., 1903.

[SEAL.]

F. I. ALLEN,
*Commissioner of Patents.*

No. 741,256.

It is hereby certified that in Letters Patent No. 741,256, granted October 13, 1903, upon the application of William A. Lawrence, of New York, N. Y., for an improvement in the "Art of Extracting Gum," errors appear in the printed specification requiring correction, as follows: On page 3, line 58, a period should be substituted for the comma after the word "off," and the following word "whereas" should commence with a capital W; in line 61, same page, a comma should be substituted for the period after the word "evaporation," and the following word "Alcohol" should commence with a small a instead of a capital; and that the said Letters Patent should be read with these corrections therein that the same may conform to the record of the case in the Patent Office.

Signed and sealed this 27th day of October, A. D., 1903.

[SEAL.]

F. I. ALLEN,
*Commissioner of Patents.*